(12) United States Patent
Smolka et al.

(10) Patent No.: US 12,204,090 B2
(45) Date of Patent: Jan. 21, 2025

(54) TUNABLE PRISM WITH INTEGRATED TUNABLE LENS AND REDUCED CROSSTALK

(71) Applicant: Nextlens Switzerland AG, Dietikon (CH)

(72) Inventors: Stephan Smolka, Dietikon (CH); Johannes Haase, Wädenswill (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 315 days.

(21) Appl. No.: 17/929,310

(22) Filed: Sep. 2, 2022

(65) Prior Publication Data
US 2023/0066567 A1    Mar. 2, 2023

(30) Foreign Application Priority Data

Sep. 2, 2021 (DE) ...................... 10 2021 122 783.6

(51) Int. Cl.
*G02B 26/00* (2006.01)
*G02B 3/14* (2006.01)
(Continued)

(52) U.S. Cl.
CPC .............. *G02B 26/004* (2013.01); *G02B 3/14* (2013.01); *G02B 5/06* (2013.01); *G02B 7/02* (2013.01);
(Continued)

(58) Field of Classification Search
CPC .......... G02B 26/004; G02B 3/14; G02B 5/06; G02B 7/02; G02B 7/1805; G02B 26/0883; G02B 27/646; G02B 26/0891
See application file for complete search history.

(56) References Cited

U.S. PATENT DOCUMENTS

| 2015/0028195 A1 | 1/2015 | King |
| 2018/0100953 A1 | 4/2018 | Aschwanden |

(Continued)

FOREIGN PATENT DOCUMENTS

| CN | 111684334 | 9/2020 |
| JP | H11133210 | 5/1999 |

(Continued)

*Primary Examiner* — James C. Jones
(74) *Attorney, Agent, or Firm* — JMB Davis Ben-David (57) ABSTRACT

The present invention relates to an optical device (1), comprising: a container (10) enclosing an internal space (11) of the container (10), the internal space (11) being filled with a transparent liquid (12), wherein the container (10) comprises a transparent and elastically deformable membrane (13) delimiting said internal space (11) at least partially, wherein the container (10) further comprises a transparent rigid optical element (2) being connected to said membrane (13), the rigid optical element (2) comprising an optical surface (20) facing the membrane (13), the rigid optical element (2) being configured to receive light (L) for passing the light (L) through the transparent liquid (12) residing in the internal space (11) of the container (10), wherein the optical device (1) further comprises a supporting structure (3) supporting the rigid optical element (2) so that the rigid optical element (2) is tiltable about at least a first tilting axis (X) extending along said optical surface (20) of the rigid optical element (2) to deflect light passing through the container (10), wherein the supporting structure (3) is configured to prevent a translation of the rigid optical element (2) in a direction parallel to an optical axis (A) of the optical device.

15 Claims, 6 Drawing Sheets

(51) Int. Cl.
*G02B 5/06* (2006.01)
*G02B 7/02* (2021.01)
*G02B 7/18* (2021.01)
*G02B 26/08* (2006.01)
*G02B 27/64* (2006.01)

(52) U.S. Cl.
CPC ....... *G02B 7/1805* (2013.01); *G02B 26/0883* (2013.01); *G02B 27/646* (2013.01)

(56) References Cited

U.S. PATENT DOCUMENTS

2019/0104239 A1 4/2019 Aschwanden
2020/0355910 A1* 11/2020 Smolka .............. G02B 26/0833

FOREIGN PATENT DOCUMENTS

| WO | 2019030129 | 2/2019 |
| WO | 2021121681 | 6/2021 |

* cited by examiner

TUNABLE PRISM WITH INTEGRATED TUNABLE LENS AND REDUCED CROSSTALK

CROSS-REFERENCE TO RELATED APPLICATIONS

This application claims priority to German Patent Application No. 10 2021 122 783.6, filed on Sep. 2, 2021.

FIELD

The present invention relates to an optical device, particularly to a tunable prism, particularly to a tunable prism with integrated tunable liquid lens. Such a tunable prism can be applied in an optical system to achieve optical image stabilization system (OIS).

BACKGROUND

In the state of the art, optical image stabilization in optical imaging systems is well established.

For example, in hand-held cameras, found e.g. in mobile phones, a lateral or rotational motion of the camera, e.g. caused by shaking hands, would lead to a lateral shift of the image projected on the image sensor of the camera if no image stabilization would be employed. Particularly, optical image stabilization refers to the method of compensating said shift or rotation or even to prevent such a lateral shift, by adjusting the imaging optics of the imaging system accordingly.

This can e.g. be facilitated by a tunable prism in the optical path of the imaging system. Once a lateral motion of the image sensor is detected, the tunable prism is adjusted such that incident light is deflected by the tunable prism in a way that the light hits the image sensor on the same location as would have hit the image sensor without motion.

A tunable prism comprises usually a liquid volume which is at least partially delimited by means of a flexible membrane. A transparent rigid optical element is attached to the membrane (e.g. for receiving incident light to be deflected). Particularly, the membrane provides a sealing of the liquid volume, as well as a bearing for the transparent rigid optical component. The bearing on the membrane allows tilting the transparent rigid optical element. However, the bearing of the transparent rigid optical element on the membrane additionally allows to displace the transparent rigid optical element along the optical axis.

This displacement of the transparent rigid optical element becomes particularly problematic, if the liquid volume is also used as part of a tunable lens, because displacing the transparent rigid optical element along the optical axis alters the pressure in the liquid volume, which changes the optical power of the tunable lens and thus results in an unwanted crosstalk between the tunable lens and the prism.

In the prior art, such problems are typically addressed by providing a separate conventional lens for focusing and a conventional prism for optical image stabilization. However, due to the complete separation of both components such systems are usually rather bulky.

SUMMARY

Based on the above, the problem to be solved by the present invention is to provide an optical device that is improved regarding the bearing of a transparent rigid optical element.

This problem is solved by an optical device having the features of claim 1. Preferred embodiments of this aspect are stated in the independent claims and are described below.

According to claim 1 an optical device for deflecting light impinging on the optical device is disclosed, the optical device comprising:
- a container enclosing an internal space of the container, the internal space being filled with a transparent liquid, wherein the container comprises a transparent and elastically deformable membrane delimiting said internal space at least partially,
- a transparent rigid optical element being connected to said membrane, the rigid optical element comprising an optical surface facing the membrane, the rigid optical element being configured to receive light for passing the light through the transparent liquid residing in the internal space of the container, wherein the optical device further comprises a supporting structure supporting the rigid optical element so that the rigid optical element can be tilted with respect to the container about at least a first tilting axis extending along said optical surface of the rigid optical element to deflect light passing through the container (so that the container forms an adjustable prism), wherein the supporting structure is configured to prevent a relative linear translational motion of the rigid optical element and the container with respect to one another in a direction parallel to an optical axis of the optical device, wherein in particular, the optical axis extends orthogonal to said optical surface of the rigid optical element, when the rigid optical element is in a non-tiled state (i.e. passes light without deflecting it). In other words, the optical axis extends orthogonal to the at least one first tilting axis.

In particular, tilting the rigid optical element with respect to the container alters an angle between the optical surface and a further optical surface. The further optical surface is arranged on a side of the container which is opposed to the optical surface.

In certain embodiments that will be described in more detail below, this can be achieved by bearing the transparent rigid optical element by means of a gimbal supporting structure which limits the movement of the rigid optical component in the direction of the optical axis (with respect to a state where the rigid optical element is in a non-tilted state, i.e., lets light pass without deflecting it), i.e. perpendicular to the tilting axes of the gimbal supporting structure.

According to a preferred embodiment, the first membrane and a second membrane are arranged on opposite sides of the container, wherein the rigid optical element (e.g. formed out of a glass) is pivotably supported on the first membrane, wherein the rigid optical element is supported thereon in such a way that due to pivoting a pressure in the internal space of the container (i.e. a pressure of said liquid) is not altered (i.e. remains constant), wherein a curvature of the second membrane is adjustable by means of changing the pressure in the internal space of the container (e.g. by means of a suitable lens actuator) so as to adjust the optical power of the container.

Generally, the supporting structure can define one or two tilting axes, around which the transparent rigid optical component may be tilted. Preferably, the tilting axes extend along an optical surface of the rigid optical component. This optical surface can face the membrane and can be connected to the membrane.

In particular, the pressure/volume of the liquid volume is not altered by tilting the transparent rigid optical component using the supporting structure, particularly gimbal supporting structure. Advantageously, this results in a minimized crosstalk between tuning of optical power and tuning of prism, which allow precise focusing and OIS.

The transparent rigid optical element can consist out of or can comprise a glass or a polymer. The elastically deformable membrane(s) can consist out of or can comprise PDMS.

Further, the liquid residing in the internal space of the container can be one of or can comprise one of: water, oil, glycerine.

In an embodiment, the supporting structure comprises a first frame member and a mounting structure, wherein the transparent rigid optical element is carried by the first frame member, the first frame member being rotatably supported on the mounting structure so that the rigid optical element is tiltable about said first tilting axis.

Particularly, such a supporting structure can be a supporting structure allowing a one-dimensional tilting of the transparent rigid optical element about a single (first) tilting axis.

According to a further embodiment, the supporting structure comprises a second frame member, wherein the first frame member is rotatably supported on the second frame member so that the first frame member is tiltable about the first tilting axis with respect to the second frame member, and wherein the second frame member is rotatably supported on the mounting structure so that the second frame member and therewith the first frame member and the transparent rigid optical element are tiltable about a second tilting axis. Here, the supporting structure forms a gimbal supporting structure.

Particularly, in an embodiment, the first and the second tilting axis extend obliquely with respect to one another, in particular, these two axes extend perpendicular with respect one another. Furthermore, in an embodiment, both tilting axes extend perpendicularly to the optical axis.

As already indicated, the supporting structure according to the present invention can be a supporting structure allowing a two-dimensional tilting of the transparent rigid optical element about a first tilting axis and a different second tilting axis. The second tilting axis can be orthogonal to the first tilting axis.

Further, according to an embodiment, the optical device comprises a tilting actuator configured to tilt the transparent rigid optical element about the first and/or second tilting axis. Particularly, the tilting actuator can be any actuator or combination of actuators that allow to tilt the transparent rigid optical element about the first and/or second tilting axis, particularly the tilting actuator can be configured to exert a force on the first and/or second frame member. Furthermore, according to a preferred embodiment, the first and second tilting axes extend along axes of symmetry of the optical surface. Thus, the pressure in the internal space remains constant when tilting the rigid optical element with respect to the container.

According to an embodiment, the container comprises a further transparent and elastically deformable membrane delimiting said internal space at least partially, the further membrane facing the other membrane of the container, and wherein the container comprises a further transparent rigid optical element being connected to said further membrane, wherein the further rigid optical element comprises an optical surface facing the further membrane, the further rigid optical element being configured to allow light passing through the transparent liquid to exit the container. The optical device comprises a further supporting structure supporting the further rigid optical element so that the rigid optical element is tiltable about a second tilting axis extending along said optical surface of the further rigid optical element to deflect light passing through the container, wherein the further supporting structure is configured to prevent a translation of the further rigid optical element in a direction parallel to the optical axis (or orthogonal to the tilting axes).

Particularly, in an embodiment, the two tilting axes are orthogonal. Particularly, each supporting structure can be a supporting structure allowing a one-dimensional tilting of the respective transparent rigid optical element, wherein particularly the two tilting axes can be orthogonal (e.g. x- and y-direction with the z-direction corresponding to the optical axis of the optical device/adjustable prism). Particularly, both membranes of the container are connected to a circumferential rigid wall of the container.

According to an alternative embodiment, both supporting structures can be configured to allow a two-dimensional tilting of the respective transparent rigid optical element. Here, particularly, either the transparent rigid optical element or the further transparent rigid optical element is tilted. Particularly, the membrane forms at least a portion of a flexible circumferential lateral wall of the container.

According to a preferred embodiment, the optical device comprises a pivot point where the first and the second tilting axes cross one another, wherein the pivot point can be located on the optical axis of the optical device and/or on the optical surface of the transparent rigid optical element. Particularly, the pivot point is arranged at a point of symmetry of the optical surface, particularly as seen in a top view of said optical surface.

Further, in an embodiment, the container comprises a further transparent and elastically deformable membrane facing the other transparent and elastically deformable membrane, wherein said liquid is arranged between the two membranes.

Furthermore, according to an embodiment, the optical device comprises a lens actuator configured to move a portion of the container linearly with respect to the transparent rigid optical element, particularly along the optical axis of the optical device, without tilting of said portion so as to deform said further membrane and to therewith adjust an optical power of the container. Particularly, to avoid said tilting, the lens actuator can comprise guiding rails for guiding a mover of the lens actuator, which mover is coupled to said portion of the container.

Particularly, in an embodiment, said portion of the container comprises a circumferential wall of the container to which the transparent rigid optical element is connected via the transparent and elastically deformable membrane.

In an embodiment, the container comprises a further transparent and elastically deformable membrane connected to the circumferential wall such that the transparent liquid is arranged between the two membranes. Particularly, when the wall is moved with respect to the transparent rigid optical element, the two membranes are deformed, leading to a desired adjustment of an optical power of the container.

Furthermore, in an embodiment, the optical device comprises a reservoir connected to the container, wherein the optical device preferably comprises a lens actuator configured to pump said liquid from the reservoir into the internal space of the container of the optical device and vice versa to deform said further membrane and to therewith adjust an optical power of the container.

Further, in an embodiment, the optical device comprises a lens shaper arranged on the further membrane, and a lens actuator configured to push the lens shaper against the further membrane (particularly in a direction parallel to the optical axis of the optical device, i.e. orthogonal to the first and/or second tilting axis) without tilting the lens shaper to deform said further membrane and to therewith adjust an optical power of the container. Particularly, to avoid tilting, the lens actuator can comprise guiding rails for guiding a mover of the lens actuator, which mover is coupled to said portion of the container.

Particularly, in an embodiment, tilting of said portion (e.g. lateral wall of container) or of the lens shaper is prevented by either guiding the movement of said portion or lens shaper and/or by guiding a mover of the lens actuator (see also above) and/or by using a linear lens actuator.

Further, according to an embodiment, the first frame member comprises an inner frame portion to which the transparent rigid optical element is connected and an outer frame portion surrounding the inner frame portion, wherein the inner frame portion is connected to the outer frame portion by a plurality of struts, particularly four struts. Particularly, in an embodiment, the four struts extend in the same extension plane, each strut being preferably orthogonal to two other struts.

According to yet another embodiment, the mounting structure comprises two opposing connection pads, the connection pads being connected to a mount, particularly to a housing of the optical device.

Particularly, in case the supporting structure comprise the first frame, the latter can be rotatably supported on the two connection pads so that the first frame is tiltable about the first tilting axis. In case the supporting structure also comprises the second frame member, the latter is rotatably supported on the connection pads.

In an embodiment, the first frame member is connected to the mounting structure via two opposing bearings. Particularly, the first frame member is connected to each connection pad via a bearing.

In an embodiment, the second frame member is connected to the mounting structure via two opposing bearings. Particularly, the second frame member is connected to each connection pad via a bearing.

Furthermore, in an embodiment, the first frame member is connected to the second frame member via two opposing bearings.

According to an embodiment, the respective bearing described above, can be one of a ball bearing, a torsion spring, a meandering spring. Particularly, also a combination of these bearings can be used.

According to a further embodiment, the first and the second frame member as well as the mounting structure (e.g. said connection pads) are integrally formed as a metal plate comprising a thickness, and wherein the supporting structure further comprises a circumferential support frame arranged on the second frame member, particularly in a congruent fashion, wherein the support frame comprises a thickness being larger than the thickness of the metal plate.

Further, in an embodiment, the supporting structure comprises a mounting structure, wherein the transparent rigid optical element is supported on one side, particularly merely on one side, via a ball joint on the mounting structure.

Furthermore, the transparent rigid optical element is tiltable about the first tilting axis and a second tilting axis, the optical device comprises two tilting actuators each actuator acting on an edge region of the transparent rigid optical element, wherein the ball joint and the tilting actuators are equidistantly spaced along a periphery of the transparent rigid optical element, i.e. at 120°.

Further, in an embodiment, the supporting structure comprises a transparent mount forming part of the container and a plurality of elastically bendable legs connecting the transparent rigid optical element to the mount such that the rigid optical element is tiltable about the first tilting axis, wherein the legs are arranged at an angle with respect to the rigid optical element.

Particularly, the transparent rigid optical element is arranged on a frame member, the legs connecting the frame member to the mount, wherein the membrane is connected to the mount and to the frame member and/or rigid optical element to delimit the internal space of the container. Particularly, the legs are arranged outside the internal space of the container.

Furthermore, in an embodiment, the supporting structure comprises two pair of legs arranged on opposing edge portions of the transparent rigid optical element, each pair comprising two legs extending towards one another.

In particular, the tilting axis of the optical element can be defined by the angle at which the legs of the respective pair extend relative to each other. Particularly, the tilting axis is located at the intersection of the imaginary extension of the legs. Particularly, the legs prevent translation of the optical element along the optical axis and allow tilting about the tilting axis.

Further, according to an embodiment, the first tilting axis is positioned at an interface between the transparent rigid optical element and the liquid residing in the internal space.

Furthermore, in an embodiment, the supporting structure comprises three legs extending at an angle with respect to the transparent rigid optical element, wherein the legs are equidistantly spaced along a periphery of the transparent rigid optical element at 120° distance, so that the rigid optical element can be tilted about the first tilting axis as well as about a second tilting axis. Preferably, the first and the second tilting axes are located on the transparent rigid optical element.

In the above embodiments, the supporting structure is configured to supporting/bearing the transparent rigid optical element and adjusting the optical power is accomplished by acting with a lens actuator on the container (e.g. on its lateral wall), on the further membrane or on a reservoir of the liquid. However, the principle according to the present invention can also be applied to the container, i.e., by supporting the container by means of the supporting structure to tilt it without moving it linearly in the direction of the optical axis, and causing a linear motion of the transparent rigid optical element to adjust the optical power of the container (tunable lens). In a similar fashion the supporting structure can be used to tilt the lens shaper without moving it linearly in the direction of the optical axis, while the transparent rigid optical element is linearly moved to adjust the optical power of the container (tunable lens). This is addressed in the aspects of the present invention described in the following.

According thereto, an optical device for deflecting light impinging on the optical device is disclosed, the optical device comprising:

a container enclosing an internal space of the container, the internal space being filled with a transparent liquid, wherein the container comprises a transparent and elastically deformable membrane delimiting said internal space at least partially, wherein the container further comprises a transparent rigid optical element being connected to said membrane, the transparent rigid optical element comprising an optical surface facing the membrane, the transparent rigid optical element being configured to receive light for passing the light through the transparent liquid residing in the internal space of the container, wherein the optical device further comprises a supporting structure supporting the container so that a portion of the container can be tilted with respect to the transparent rigid optical element about at least a first tilting axis extending along said optical surface of the transparent rigid optical element to deflect light passing through the container (i.e. the container forms an adjustable prism), wherein the supporting structure is configured to prevent a linear translational motion of said portion of the container in a direction parallel to an optical axis of the optical device. Particularly, the optical axis extends orthogonal to an outer surface of the transparent rigid optical element. Particularly, said portion of the container is a circumferential lateral wall of the container.

Particularly, according to an embodiment, the optical device comprises a lens actuator for moving the transparent rigid optical element in a direction parallel to the optical axis without tilting the transparent rigid optical element so as to deform a further membrane of the container that faces the first membrane in order to adjust an optical power of the container. Particularly, the two membranes are connected to the circumferential lateral wall with the liquid being arranged between the two membranes.

Particularly, as described above, to avoid said tilting, the lens actuator can comprise guiding rails for guiding a mover of the lens actuator, which mover is coupled to said portion of the container.

The supporting structure can be formed according to the embodiments described above, wherein here it is said portion (e.g. lateral wall) of the container that is tilted instead of the transparent rigid optical element. Particularly, the supporting structure can comprise said first and second frame member, with the said portion of the container being connected to the first frame member or forming the first frame member or a portion thereof.

Further, according to an embodiment, the optical device comprises a tilting actuator configured to tilt said portion of the container (e.g. lateral wall) about the first and/or second tilting axis. Particularly, the tilting actuator can be any actuator or combination of actuators that allow to tilt said portion of the container about the first and/or second tilting axis.

According to yet another aspect of the present invention, an optical device for deflecting light impinging on the optical device is disclosed, the optical device comprising:
- a container enclosing an internal space of the container, the internal space being filled with a transparent liquid, wherein the container comprises a first and an opposing second transparent and elastically deformable membrane delimiting said internal space at least partially, wherein the liquid is arranged between the first and the second membrane,
- wherein the container further comprises a transparent rigid optical element being connected to the first membrane, the transparent rigid optical element comprising an optical surface facing the first membrane, the transparent rigid optical element being configured to receive light for passing the light through the transparent liquid residing in the internal space of the container,
- a lens shaper arranged on the second membrane,
- a lens actuator configured to move the transparent rigid optical element (particularly in a direction parallel to an optical axis of the optical device) without tilting the transparent rigid optical element so as to deform said second membrane and to therewith adjust an optical power of the container, wherein the optical device further comprises a supporting structure supporting the lens shaper so that the lens shaper can be tilted about at least a first tilting axis to deflect light passing through the container (i.e. the container forms an adjustable prism), wherein the supporting structure is configured to prevent a linear translational motion of the lens shaper in a direction parallel to the optical axis of the optical device.

The supporting structure can be formed according to the embodiments described above, wherein here it is the lens shaper that is tilted (e.g. instead of the transparent rigid optical element) Particularly, the supporting structure can comprise said first and second frame member, with the lens shaper being connected to the first frame member or forming the first frame member or a portion thereof.

Further, according to an embodiment, the optical device comprises a tilting actuator configured to tilt the lens shaper about the first and/or second tilting axis. Particularly, the tilting actuator can be any actuator or combination of actuators that allow to tilt the lens shaper about the first and/or second tilting axis, particularly the actuator can be configured to exert a force on the first and/or second frame member.

BRIEF DESCRIPTION OF THE DRAWINGS

Further features and advantages of the present inventions as well as embodiments of the present invention shall be described in the following with reference to the Figures, wherein.

DETAILED DESCRIPTION

Figure 1:
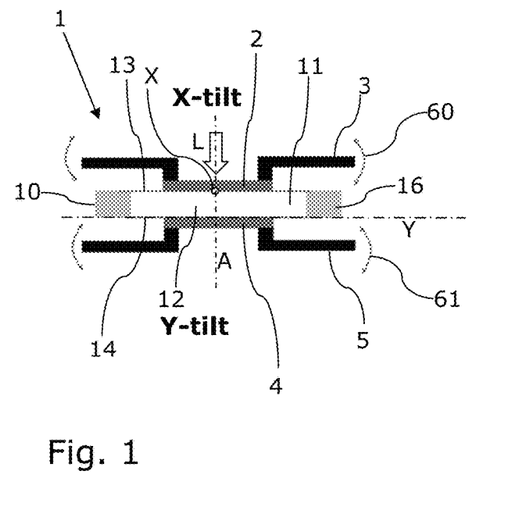
FIG. 1 shows an embodiment of an optical device according to the invention in the form of an adjustable prism comprising two transparent rigid optical elements, each being tiltable about a single axis, wherein the axes extend in different directions.

FIG. 1 shows an embodiment of an optical device 1 according to the present invention, here forming an adjustable prism, wherein the optical device 1 comprises a container 10 enclosing an internal space 11 of the container 10, the internal space 11 being filled with a transparent liquid 12, wherein the container 10 comprises two transparent and elastically deformable membranes 13, 14 being connected to a circumferential lateral wall 16 and delimiting said internal space 11 with the liquid 12 being arranged between the membranes 13, 14. Furthermore, a transparent rigid optical element 2, 4 (e.g. a glass plate) is connected to each membrane 13, 14, the respective rigid optical element 2 comprising an optical surface 20, 40 facing the respective membrane 13, 14, wherein one rigid optical element 2 is configured to receive light L for passing the light L through the container 10 and the transparent liquid 12 residing in the internal space 11 of the container 10, while the other rigid optical element 4 is configured for letting the light L exit the container 10. Furthermore, the optical device 1 comprises a supporting structure 3, 5 for each rigid optical element 2, 4 so that one rigid optical element 2 is tiltable about a first tilting axis X extending along said optical surface 20, while the other rigid optical element 4 is tiltable about a different second tilting axis Y extending along the optical surface 40 of the other transparent rigid optical element 4. Both supporting structures 3, 5 however prevent a movement of the respective transparent rigid optical element 2, 4 in the direction of the optical axis A, i.e. perpendicular to the tilting axes X, Y.

Figure 2:
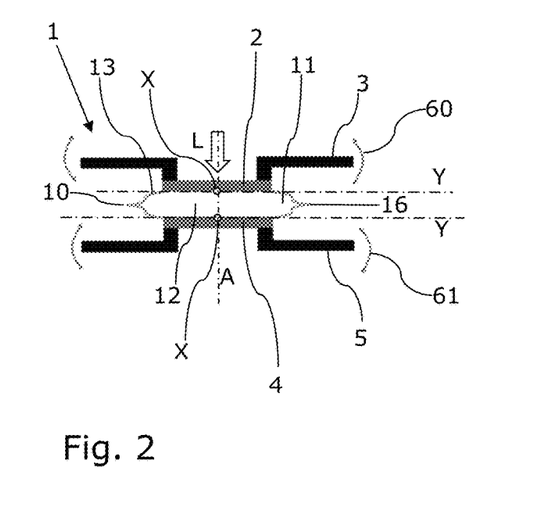
FIG. 2 shows an embodiment of an optical device according to the invention in the form of an adjustable prism comprising two transparent rigid optical elements, each being tiltable about two tilting axes, so that at one time only one of the transparent rigid optical elements has to be tilted.

While FIG. 1 shows an embodiment of an adjustable prism 1 where each optical element 2, 4 can be tilted about a single axis X, Y only and a deflection of the light L in 2D thus requires tilting both rigid optical elements 2, 4 about the respective axis X, Y, FIG. 2 shows a further embodiment, wherein here each supporting element 3 allows a two-dimensional tilting about two different axes X, Y. Further, here the lateral wall 16 is formed by at least one flexible membrane 13 being connected to the rigid optical elements 2, 4 to form a flexible lateral wall 16 of the container 10.

Figure 6:
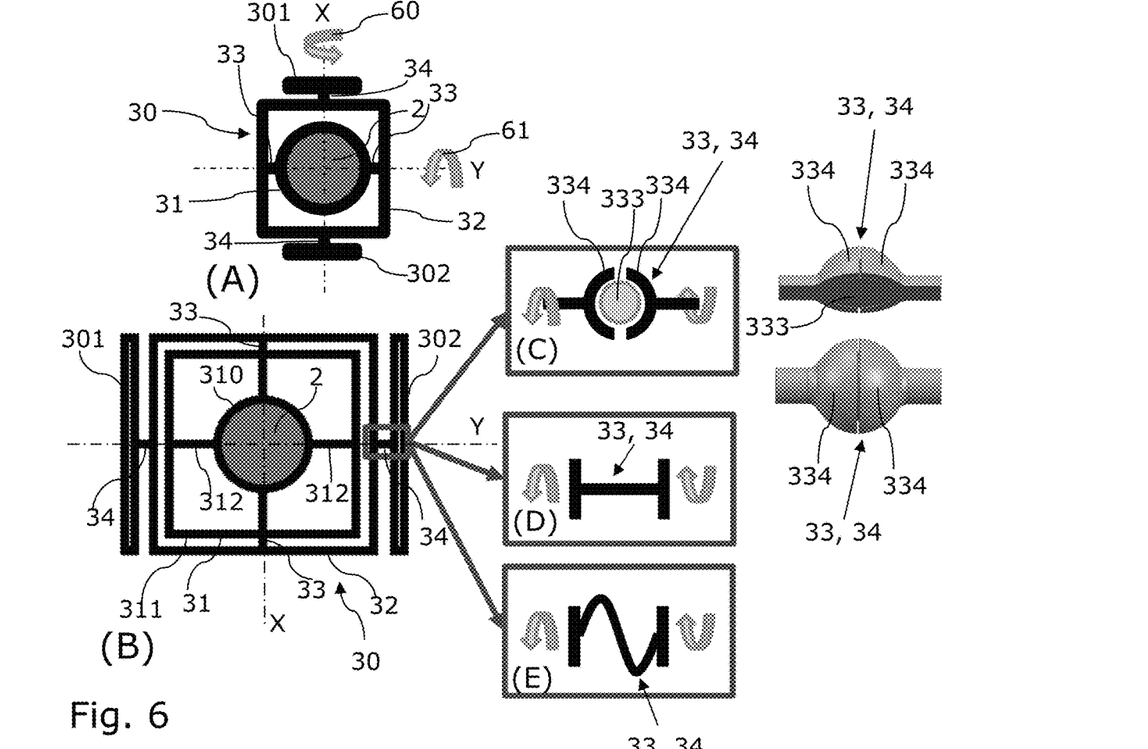
FIG. 6 illustrates different embodiments of rotatably supporting the first or second frame member of a supporting structure by means of bearings.

The supporting structure 3 shown in FIG. 2 can be designed as shown in FIG. 6 for example. According to FIG. 6(A) the supporting structure 3 comprises a first circumferential (e.g. rectangular) frame member 31, a second circumferential (e.g. rectangular) frame member 32 and a mounting structure 30, wherein the transparent rigid optical element 2 is carried by the first frame member 31, the first frame member 31 being rotatably supported on a second frame member 32, which in turn is rotatably mounted on the mounting structure 30 that can comprise two connection pads 301, 302 that may connect directly or indirectly to some structure of the optical device 1 like a housing of the optical device 1. Particularly, as shown in FIG. 6(A), the first frame member 31 is rotatably supported by two opposing bearings 33 on the second frame member 32, these bearings 33 being aligned with one another to define the first tilting axis X. Likewise, the second frame member 32 is supported by two opposing bearings 34 on the mounting structure 30, e.g. the connections pads 301, 302. Further, these bearings 34 are aligned with one another to define the second tilting axis Y.

As shown in FIG. 6(C) the respective bearing 33, 34 can be a ball bearing comprising e.g. a single ball 333 arranged between opposing bearing shells 334. Alternatively, the respective bearing 33, 34 can be a torsion spring 33, 34 (cf. FIG. 6(D)), or a meandering spring 33, 34 (cf. FIG. 6(E)).

Particularly, in case only a single tilting axis X is needed, the supporting structure 3 only needs the first frame member 31 to which the transparent rigid optical element 2 is then mounted, the first frame member 31 being rotatably supported on the mounting structure 30, e.g. on the connection pads 301, 302, by two opposing bearings, wherein the respective bearing can be one of the above-described types.

In order to tilt the rigid optical element 2 about the first and/or second tilting axis X, Y the optical device 1 can comprise at least one titling actuator 60, 61 for each tilting axis X, Y. Particularly, the respective tilting actuator 60, 61 can be configured to exert a force on the first frame member 31 for tilting the latter about the first tilting axis X, while the other tilting actuator 61 can be configured to exert a force on the second member 32 for tilting the latter about the second tilting axis Y.

Figure 3:
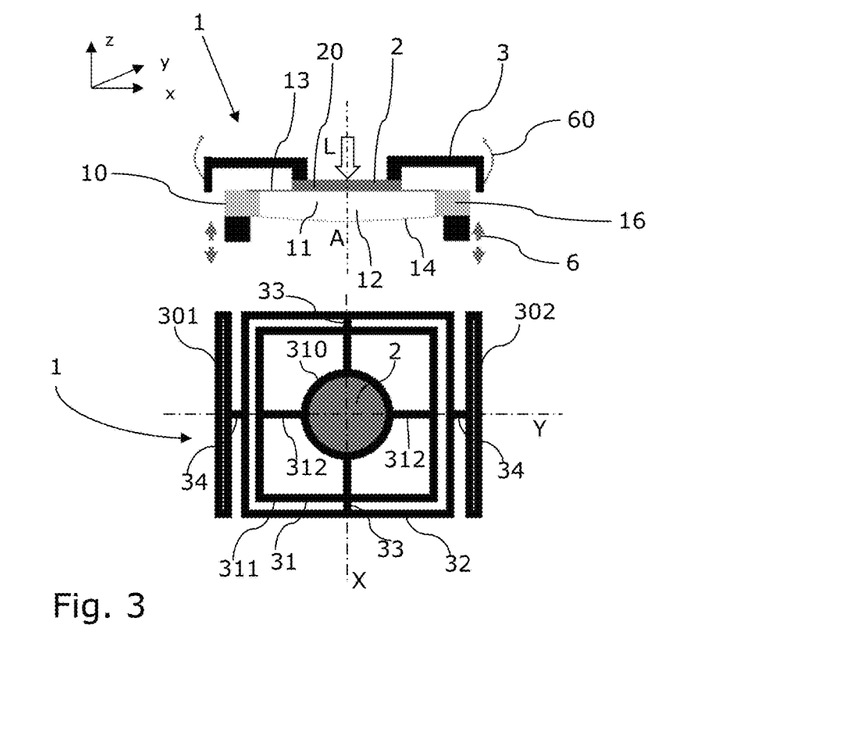
FIG. 3 shows an embodiment of an optical device according to the invention, wherein the transparent rigid optical element is supported by a gimbal supporting structure and tilted so that the container forms an adjustable prism while a lateral wall of the container is moved linearly in order to adjust the optical power of the container, i.e. the container forms an adjustable liquid lens as well.

Further, FIG. 3 shows an embodiment of an optical device 1 according to the present invention, wherein the optical device 1, particularly a container 10 thereof, integrates an adjustable prism and an adjustable lens. Particularly, the container 10 encloses an internal space 11 being filled with a transparent liquid 12, wherein the container 10 comprises a transparent and elastically deformable membrane 13 and a transparent and elastically deformable further membrane 14. Both membranes 13, 14 are connected to a lateral wall 16 of the container 10, wherein said liquid 12 is arranged between the membranes 13, 14. A transparent rigid optical element 2 (e.g. in form of a circular glass plate) is connected to said membrane 13 via an optical surface 20 of the rigid optical element 2. The rigid optical element 2 is configured to receive light L for passing the light L through the container 10 and the transparent liquid 12 therein. The rigid optical element 2 can be tilted from a neutral position where it extends at an angle of 90° with respect to the optical axis A (as shown in FIG. 3) to a tilted position such that light L traveling through the rigid optical element 2 and the liquid 12 in the internal space 11 of the container 10 is deflected by the container 10. In other words, the container 10 forms an adjustable prism 1 for deflecting the incoming light L in an adjustable manner depending on the tilting angle of the rigid optical element 2.

For tilting the transparent rigid optical element 2, the optical device 1 further comprises a gimbal supporting structure 3 supporting the rigid optical element 2 so that the rigid optical element 2 is tiltable about a first tilting axis X extending along said optical surface 20 and a second tilting axis Y extending along said optical surface 20, too. Particularly, at the same time, the supporting structure 3 is configured to prevent a translation of the rigid optical element 2 in a direction parallel to the optical axis A of the optical device 1 and orthogonal to said tilting axes X, Y.

Particularly, in order to prevent said translation, the supporting structure 3 can comprise a first frame member 31, a second frame member 32, and a mounting structure 30, wherein the transparent rigid optical element 2 is carried by the first frame member 31, the first frame member 31 is rotatably supported on the second frame member 32 such that the first frame member 31 is tiltable about the first tilting axis X, wherein the second frame member 32 is rotatably supported on the mounting structure 30, particularly on two opposing connection pads 301, 302, so that the second frame member (and therewith the rigid optical element 2) is tiltable about said the second tilting axis Y. Particularly, the bearings 33, 34 described above can be used, i.e., the first frame member 31 can be rotatably supported by two opposing bearings 33 on the second frame member 32, these bearings 33 being aligned with one another to define the first tilting axis X. Likewise, the second frame member 32 can be supported by two opposing bearings 34 on the mounting structure 30, e.g. the connections pads 301, 302. Further, these bearings 34 are aligned with one another to define the second tilting axis Y.

Furthermore, as shown in FIG. 3 and particularly FIG. 6(B) (and in contrast to FIG. 6(A)), the first frame member 31 of the gimbal supporting structure 3 can comprise a sub structure. According thereto, the first frame member can comprise an inner frame portion 310 to which the transparent rigid optical element 2 is connected, and an outer frame portion 311 surrounding the inner frame portion 310, wherein the inner frame portion 310 is connected to the outer frame portion 311 by a plurality of struts 312, particularly four struts 312, each of these four struts 312 being arranged orthogonal to two other struts 312.

Furthermore, for tilting the transparent rigid optical element 2, the optical device 1 can comprise at least one tilting actuator 60 to tilt the first frame member 31 about the first tilting axis X as well as at least one tilting actuator 61 to tilt the second frame member 32 about the second tilting axis Y.

Further, the optical device 1 comprises a lens actuator 6 configured to move a portion 16 of the container 10, particularly the lateral wall 16, along the optical axis A without tilting it, which leads to a change in curvature of the further membrane 14 and therewith to a corresponding change of the optical power of the container 10. Thus, the container 10 is adapted to not only act as an adjustable prism, but also as an adjustable lens, wherein due to the linearity of the movement of the lateral wall 16 and the tilting guided by the supporting structure 3 a crosstalk between the lens and the prism function can be prevented.

Figure 4:
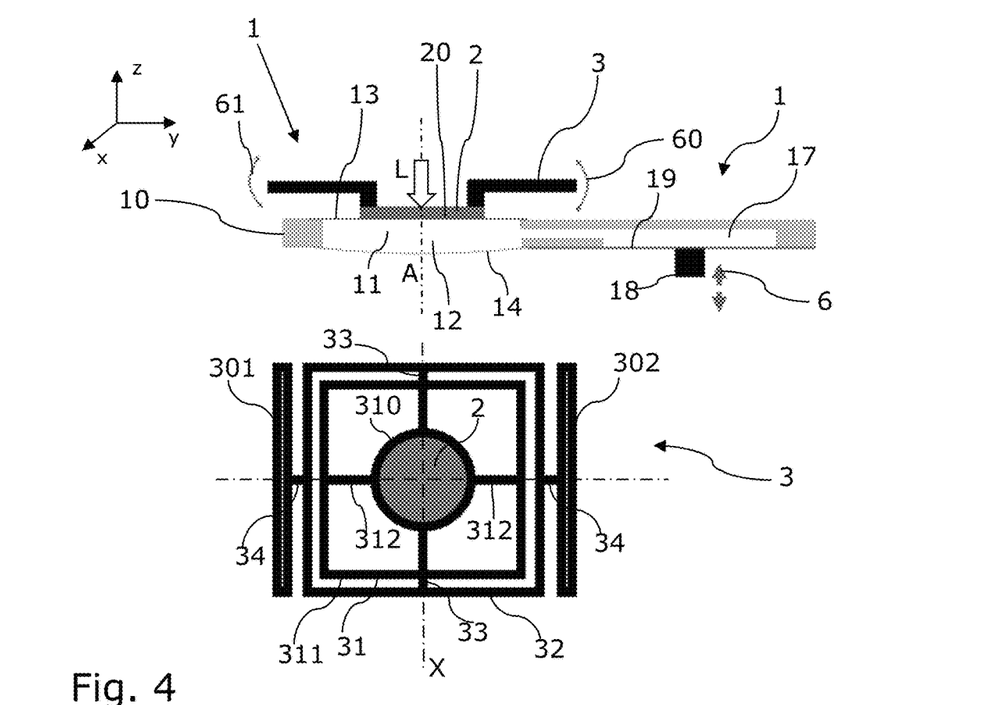
FIG. 4 shows an embodiment of an optical device according to the invention, wherein the transparent rigid optical element is e.g. supported as shown in FIG. 3 while the optical power of the container (adjustable lens) is changed by pumping liquid from a reservoir into the internal space of the container (or vice versa)

FIG. 4 shows a further embodiment of an optical device 1 according to the invention, wherein also here, the transparent rigid optical element 2 is tilted using a supporting structure 3 as described in conjunction with FIG. 3. However, in contrast to the embodiment shown in FIG. 3, the optical power of the container/lens 10 is altered by a lens actuator 6 configured to pump said liquid 12 from a reservoir 17 into the internal space 11 of the container 10 and vice versa to deform (e.g. bulge out) said further membrane 14 and to therewith adjust the optical power of the container 10. Particularly, the reservoir 17 can be integrally formed with the container 10, wherein the lens actuator 6 can be configured to move a piston 18 against a flexible wall 19 of the reservoir 17 to pump liquid 12 into the internal space 11 of the container 10.

Figure 5:
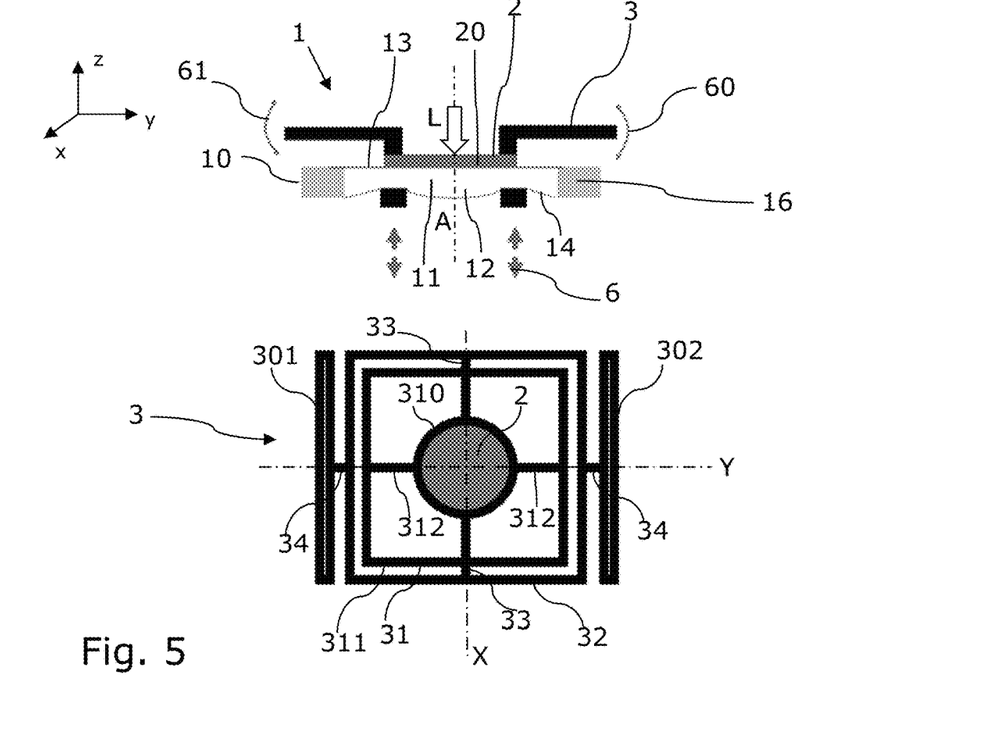
FIG. 5 shows an embodiment of an optical device according to the invention, wherein the transparent rigid optical element is supported by a gimbal supporting structure and tilted so that the container forms an adjustable prism while a lens shaper interacting with a further membrane facing the transparent rigid optical element is moved linearly in order to adjust the optical power of the container, i.e. the container forms an adjustable liquid lens as well.

Further, FIG. 5 shows a further embodiment of an optical device 1 according to the invention, wherein also here, the transparent rigid optical element 2 is tilted using a supporting structure 3 as described in conjunction with FIG. 3 or 4. However, in contrast to the embodiment shown in FIG. 3 or 4, the optical power of the container/lens 10 is altered by a lens actuator 6 configured to move a lens shaper 7 against the further membrane 14 thus deforming a portion of the membrane 14 delimited by the e.g. annular lens shaper 7. The lens shaper 7 can be moved by a lens actuator 6 without tilting the lens shaper 7. Thus, in combination with the gimbal supporting structure 3, crosstalk between the lens shaper motion and the tilting of the transparent rigid optical element 2 can be avoided.

Particularly, in all embodiments described herein, where a structure needs to moved linearly without tilting it, the respective lens actuator 6 can comprise guiding rails or a similar guiding structure for a mover of the lens actuator, which mover is coupled to the structure that is to be linearly moved (e.g. transparent rigid optical element 2, lateral wall 16, lens shaper 7). Furthermore, also a dedicated linear lens actuator can be used.

Figure 7:
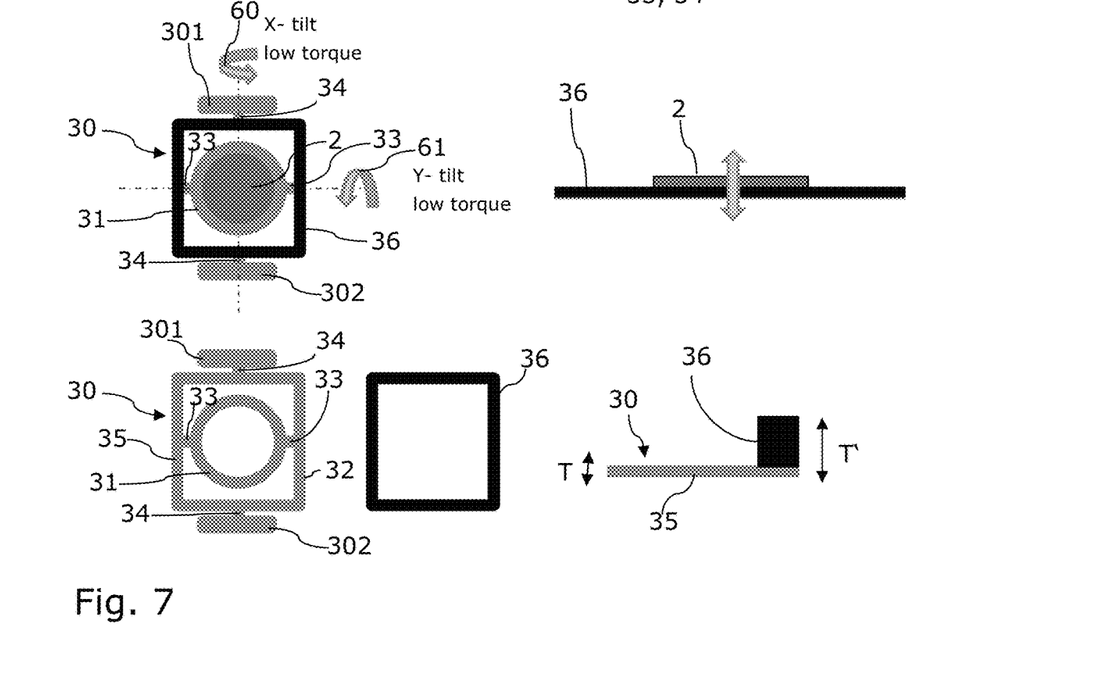
FIG. 7 illustrates the use of a support frame with the supporting structure to achieve a higher bending stiffness.

Furthermore, regarding the individual embodiments using a supporting structure 3 comprising the first and second frame member 31, 32, the first and the second frame member 31, 32 as well as the mounting structure 30 (e.g. connection pads 301, 302) can be integrally formed as a metal plate 35 as shown in FIG. 7, the metal plate 35 comprising a thickness T, and wherein the supporting structure 30 further comprises a circumferential support frame 36 arranged on the second frame member 32 (particularly in a congruential fashion), wherein the support frame 36 comprises a thickness T' being larger than the thickness T of the metal plate 35. Combining a thin metal plate 35 with a thick support frame 36 allows to have a low torsion stiffness of the metal frame and the bearings 33, 34 (e.g. torsion springs) and thus a low tilt torque, while the support frame 36 leads to a high bending stiffness in z-direction (stroke) and prohibits membrane overstretch and crosstalk (defocus).

Figure 8:
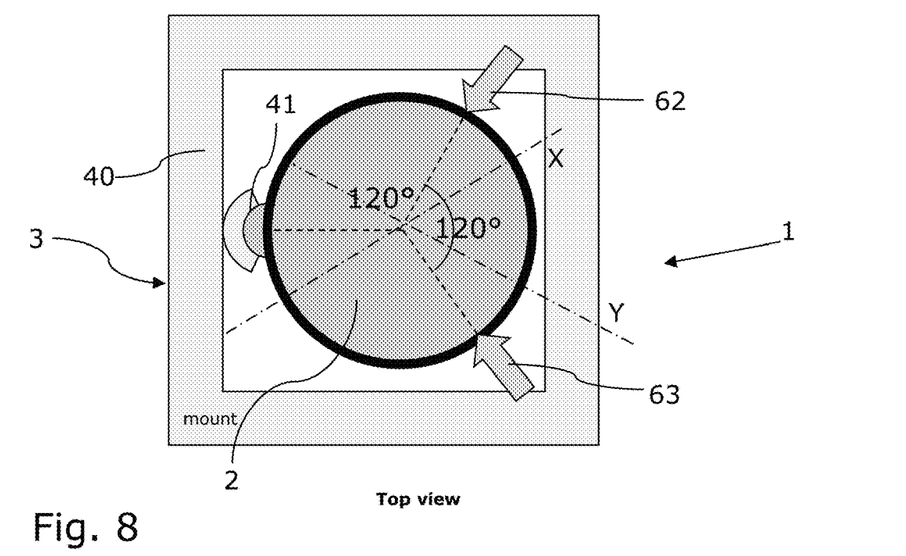
FIG. 8 shows a plan view onto an embodiment of an optical device comprising a tiltable transparent rigid optical element being supported on one side by a ball joint.
Figure 9:
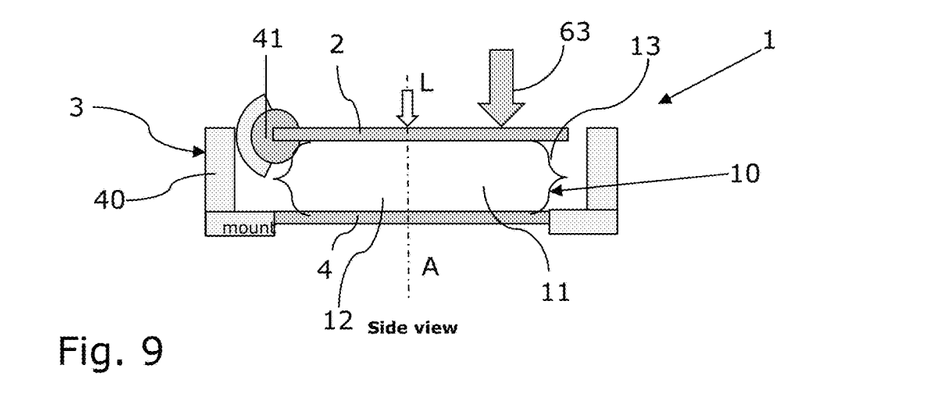
FIG. 9 shows a cross-sectional view of the embodiment of FIG. 8.

FIGS. 8 and 9 show a further embodiment of the optical device 1 according to the present invention that forms an adjustable prism 1. Here, the supporting structure 3 comprises a mounting structure 40, wherein the transparent rigid optical element 2 is supported only on one side via a ball joint 41 on the mounting structure 40. Further, for tilting the rigid optical element 2 about the first tilting axis X and a second tilting axis Y, the optical device 1 comprises two tilting actuators 62, 63 each tilting actuator 62, 63 acting on an edge region 2a, 2b of the rigid optical element 2, wherein the ball joint 41 and the tilting actuators 62, 63 are preferably equidistantly spaced along a periphery of the rigid optical element 2, i.e. spaced apart 120° along the periphery of the rigid optical element 2 which can be a circular glass plate 2. Further, the optical device 1 comprises a further transparent rigid optical element 4 held by the mounting structure 40. Both rigid optical elements 3, 4 are connected by at least one flexible membrane 13 to form a container 10 comprising an internal space being filled by the transparent liquid 12. Due to the rigid optical element 2 being supported by single joint 41, the rigid optical element 2 can be tilted with respect to the other rigid optical element 4 about two different axes X, Y so that the device 1 forms an adjustable prism 1. Particularly, in FIGS. 8 and 9 the tilting axes X, Y extend through the intersection of the dashed lines, wherein the tilting axes X, Y particularly extend perpendicular to the radial direction, respectively.

Figure 10:
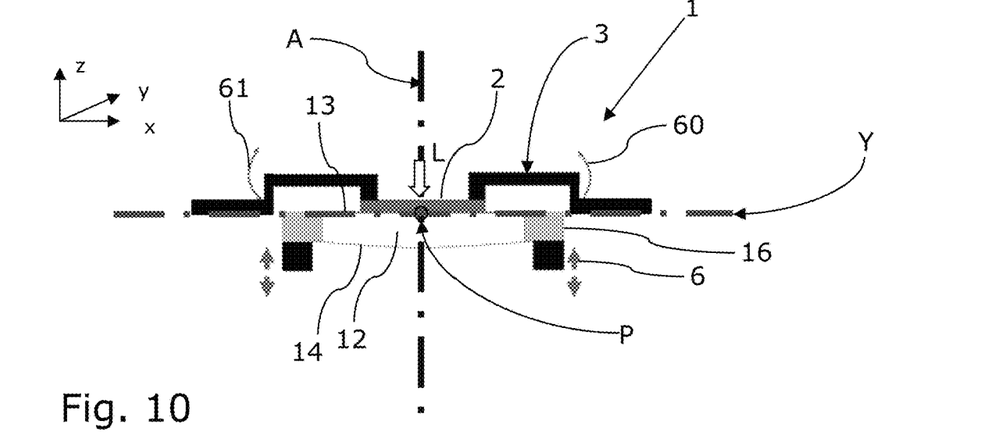
FIG. 10 shows an embodiment of an optical device according to the present invention, wherein the transparent rigid optical element comprises a defined pivot point corresponding to a crossing point of two tilting axes, the pivot point being located on the optical surface being connected to the membrane of the container.

Generally, regarding the tilting of the transparent rigid optical element 2, configurations are particularly preferred that allow a stable and defined pivot point P. As indicated in FIG. 10, the pivot point P corresponds to the crossing point of the first and the second tilting axes X, Y. Preferably, the pivot point P is located on the optical axis A of the optical device 1 and on the optical surface 20 of the rigid optical element 2.

Figure 11:
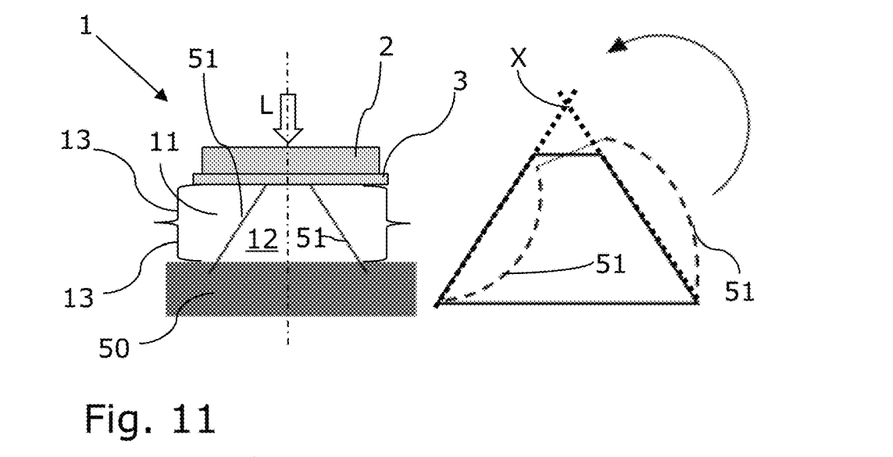
FIG. 11 shows a further embodiment of an optical device, wherein the optical device comprises a supporting structure comprising bending legs to allow tilting of the transparent rigid optical element about a single tilting axis.
Figure 12:
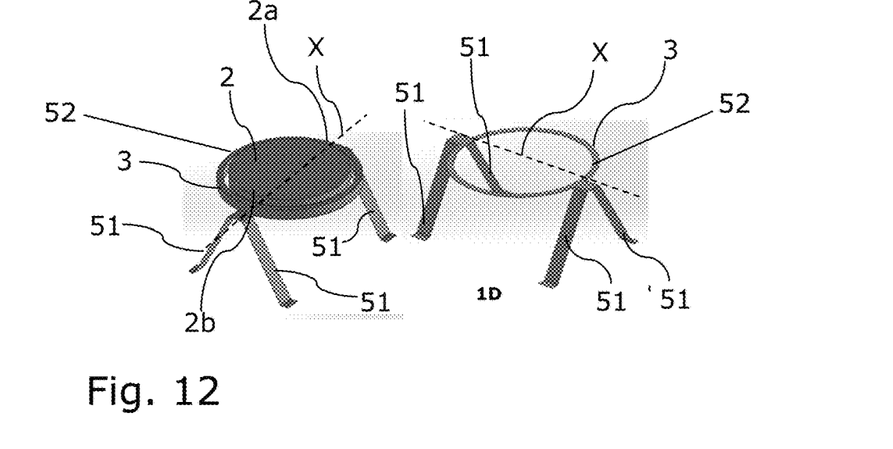
FIG. 12 shows perspective views of the bending legs shown in FIG. 11.

Furthermore, FIG. 11 shows in conjunction with FIG. 12 an optical device according to the present invention, wherein the supporting structure 3 comprises a mount 50 forming part of the container 10 or being connected to the container 10 and a plurality of elastically bendable legs 51 connecting the rigid optical element 2 to the mount 50 such that the rigid optical element 2 is tiltable about the first tilting axis X. In an embodiment, the mount 50 can be transparent. Preferably, the legs 51 are arranged at an angle with respect to the rigid optical element 2 to achieve a tilting axis X close to the rigid optical element 2 (cf. right hand side of FIG. 11). Particularly, the rigid optical element 2 is arranged on a frame member 52, the legs 51 connecting the frame member 52 to the mount 50, wherein the membrane 13 is connected to the mount 50 and to the frame member 52 and/or to the rigid optical element 2 to delimit the internal space 11 of the container 10 at least partially. The internal space 11 is filled with a transparent liquid 12. Particularly, the legs 51 are arranged outside the internal space 11 of the container 10. As particularly indicated in FIG. 12, the supporting structure 3 comprises two pair of legs 51 arranged on opposing edge portions 2a, 2b of the rigid optical element 2, each pair comprising two legs 51 extending towards one another to connect to the e.g. annular frame member 52. Advantageously, this allows the first tilting axis X to be located at an interface between the rigid optical element 2 and the liquid 12 residing in the internal space 11 of container 10.

Figure 13:
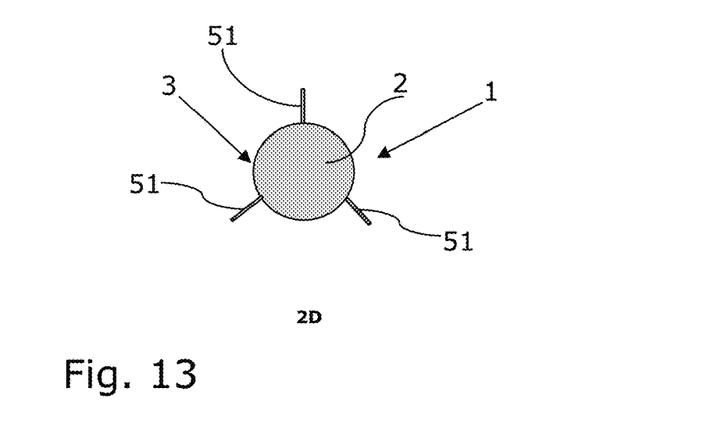
FIG. 13 shows a top view onto a modification of the embodiment shown in FIGS. 11 and 12 allowing tilting about two different tilting axes.
Figure 14:
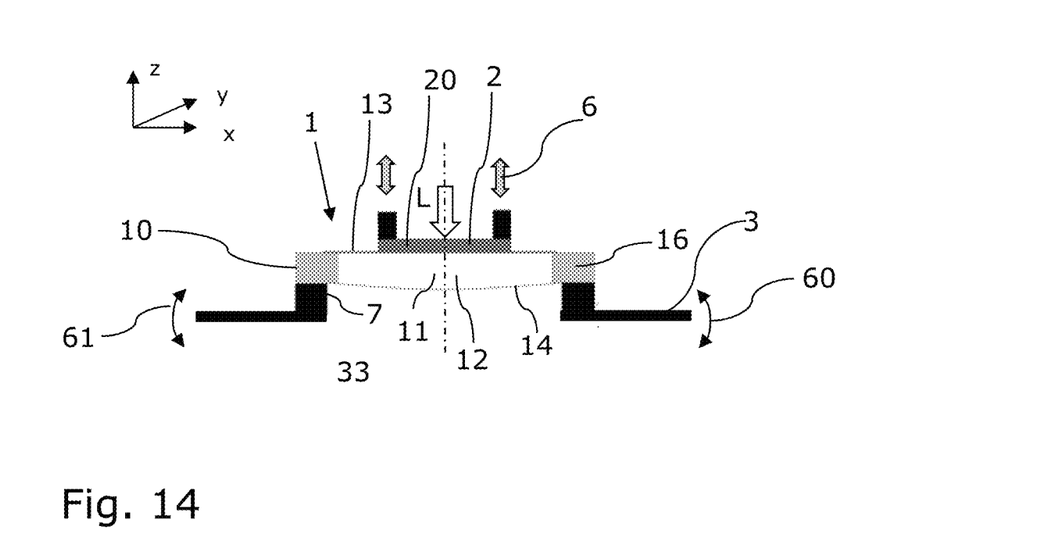
FIG. 14 shows a modification of the embodiment shown in FIG. 3, wherein here the transparent rigid optical element is moved linearly without tilting, while a lateral wall of the container is supported by a supporting structure allowing tilting of said lateral wall without translation of the latter along the optical axis.
Figure 15:
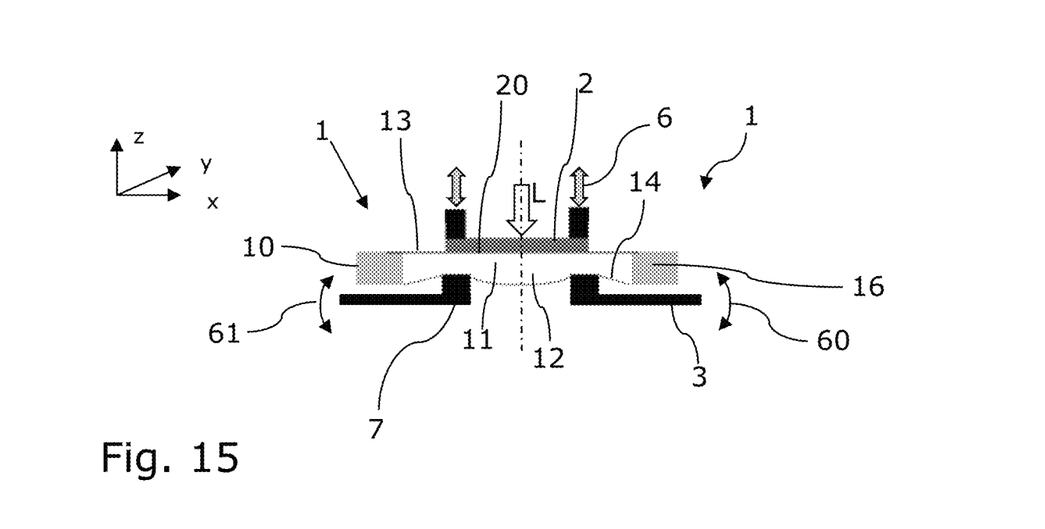
FIG. 15 shows a modification of the embodiment shown in FIG. 5, wherein here the transparent rigid optical element is moved linearly without tilting, while a lens shaper interacting with a further membrane of the container is supported by a supporting structure allowing tilting of said lens shaper without translation of the latter along the optical axis.

While the embodiment of FIGS. 11 to 12 allows tilting about a single tilting axis X only, the embodiment shown in FIG. 13 allows tilting the transparent rigid optical element 2 about two different tilting axes X, Y. To this end, the supporting structure 3 comprises three legs 51 each extending at an angle with respect to the rigid optical element 2, wherein the legs 51 are preferably equidistantly spaced along a periphery of the rigid optical element 2 at 120° distance, so that the rigid optical element 2 can be tilted about the first tilting axis X as well as about the second tilting axis Y. Here, the axes X, Y are defined by the tilting actuators used to pivot the rigid optical element 2. Particularly, the legs 51 define a pivot point which is given by the intersection of the imaginary extensions of the legs 51. Furthermore, the legs 51 prevent a translation of the rigid optical element in the direction of the optical axis. Preferably, in an embodiment, both tilting axes X, Y are preferably located on the rigid optical element 2. In the plan view of FIG. 13, the pivot point can by a symmetry point of the rigid optical element 2 (e.g. center). Furthermore, the embodiments shown in FIGS. 14 and 15 illustrate that the supporting structure 3 allowing tilting of the rigid optical element 2 can also be used to tilt the lateral wall 16 of the container 10 with respect to the transparent rigid optical element 2 which then moves purely in a linear fashion (cf. FIG. 14). Further, also the lens shaper 7 can be tilted with the supporting structure 3 while moving the transparent rigid optical element 2 only in a linear fashion (cf. FIG. 15).

Particularly, FIG. 14 shows an embodiment of the optical device 1 according to the present invention that comprises a container 10 that forms an adjustable prism as well as an adjustable lens. The container 10 encloses an internal space 11 that is filled with a transparent liquid 12, wherein the container 10 comprises a transparent and elastically deformable membrane 13 delimiting said internal space 11 at least partially. The membrane 13 faces a further transparent and elastically deformable membrane 14, both membranes 13, 14 being connected to a lateral wall 16 of the container 10 with the liquid 12 being arranged between the two membranes 13, 14. The optical device 1 further comprises a transparent rigid optical element 2 being connected to said membrane 13, the rigid optical element 2 comprising an optical surface 20 facing the membrane 13. The rigid optical element 2 is configured to receive light L for passing the light L through the container 10 and the transparent liquid 12 residing in the internal space 11 of the container 12 so that the light L exits through the further membrane 14. The rigid optical element 2 can be moved linearly towards and/or away from the membrane 13 in order to deform (e.g. bulge out) the further membrane 14 so that the container 10 forms a lens having an adjustable optical power depending on the curvature of the further membrane 14. In order to provide a prism function having no crosstalk regarding said optical power, the lateral wall 16 is supported by a supporting structure 3 so that the lateral wall 16 is tiltable with respect to the rigid optical element 2 about at least a first tilting axis X extending along said optical surface 20 and particularly also about a second tilting axis Y. The supporting structure 3 can be designed as described herein, particularly as described in conjunction with FIGS. 3, 6, and 7, wherein the lateral wall 16 is supported on the first frame member 31 (instead of the rigid optical element 2). Particularly, in FIG. 14, the container 10 is tilted relative to the rigid optical element/glass 2 guided by the supporting structure 3. Upon tilting, the tilting axis extends along the optical surface 20 adjacent the liquid volume. Thus, a pressure change in the internal space of the container 10 is avoided so that the optical power of the container/lens 10 is not altered. For adjusting the optical power of the container/lens 10, the rigid optical element 2 is moved along the optical axis. Furthermore, FIG. 15 shows an embodiment of an optical device 1 according to the present invention comprising a container 10 forming an adjustable prism as well as an adjustable lens. The container 10 enclosing an internal space 11 of the container 10, the internal space 11 being filled with a transparent liquid 12, wherein the container 10 comprises a first and an opposing second transparent and elastically deformable membrane 13, 14 delimiting said internal space 11 at least partially, wherein the liquid 12 is arranged between the first and the second membrane 13, 14. The device 1 further comprises a transparent rigid optical element 2 being connected to the first membrane 13, the rigid optical element 2 comprising an optical surface 20 facing the first membrane 13, the rigid optical element 2 being configured to receive light L for passing the light L through the container 10 and the transparent liquid 12 residing in the internal space 11 of the container 10, so that the light L can exit the container 10 via the further membrane 14. The transparent rigid optical element 2 is configured to be moved in linear fashion in order to change the curvature of a portion of the further membrane 14 that is delimited by an annular lens shaper 7 contacting the second membrane 14. For this, a lens actuator 6 is provided that is configured to push the rigid optical element 2 against the first membrane 13 without tilting it so as to deform said portion of the further membrane 14 defined by the lens shaper 7 and to therewith adjust an optical power of the container 10. To provide prism functionality to the container 10, a supporting structure 3 is provided that supports the lens shaper 7 so that the lens shaper 7 is tiltable about at least a first tilting axis X and particularly also about a second tilting axis Y to deflect light L passing through the container 10, wherein the supporting structure 3 is configured to prevent a translation of the lens shaper 7 in a direction being parallel to an optical axis A of the optical device 1, i.e. orthogonal to the tilting axes X, Y.

Particularly, the supporting structure 3 can be designed as described herein, particularly as described in conjunction with FIGS. 3, 6, and 7, wherein here the lens shaper 7 is supported on the first frame member 31 (instead of the rigid optical element 2).

Particularly, in FIG. 15, the supporting structure 3 is tilted relative to the container 10. Preferably, the tilting axis is placed such that the pressure in the internal space of the container 10 is not altered due to said tilting. Thus, the optical power of the container/lens 10 remains constant upon tilting the supporting structure 3. For adjusting the optical power, the rigid optical element 2 is moved along the optical axis, so that the pressure inside the internal space 11 of the container 10 changes.

We claim:

1. An optical device, comprising:
a container enclosing an internal space of the container, the internal space being filled with a transparent liquid, wherein the container comprises a transparent and elastically deformable first membrane delimiting said internal space at least partially,
a transparent rigid optical element being connected to the first membrane, the rigid optical element comprising an optical surface which is extensively attached to the membrane, the rigid optical element being configured to receive light (L) for passing the light (L) through the transparent liquid residing in the internal space of the container,
wherein the optical device further comprises
a supporting structure supporting the rigid optical element so that the rigid optical element is tiltable with respect to the container about at least a first tilting axis (X) extending along the optical surface of the rigid optical element to deflect light passing through the container, wherein the supporting structure is configured to prevent a relative translation of the rigid optical element and the container with respect to one another in a direction parallel to an optical axis (A) of the optical device.

2. The optical device according to claim 1, wherein the first tilting axis (X) extends along an axis of symmetry of the optical surface, particularly as seen in a top view onto the optical surface.

3. The optical device according to claim 1, wherein the supporting structure comprises a first frame member and a mounting structure, wherein the rigid optical element is carried by the first frame member, the first frame member being rotatably supported on the mounting structure so that the rigid optical element is tiltable about said first tilting axis (X).

4. The optical device according to claim 3, wherein the supporting structure comprises a second frame member, wherein the first frame member is rotatably supported on the second frame member so that the first frame member is tiltable about the first tilting axis (X) with respect to the second frame member, and wherein the second frame member is rotatably supported on the mounting structure so that the second frame member and therewith the first frame member and the rigid optical element are tiltable about a second tilting axis (Y).

5. The optical device according to claim 1, wherein the supporting structure comprises a mount forming part of the container or being connected to the container, and a plurality of elastically bendable legs connecting the rigid optical element to the mount such that the rigid optical element is tiltable about the first tilting axis (X), wherein the legs are arranged at an angle with respect to the rigid optical element, wherein particularly the supporting structure comprises two pair of legs arranged on opposing edge portions of the rigid optical element, each pair comprising two legs extending towards one another, or wherein particularly the supporting structure comprises three legs extending at an angle with respect to the rigid optical element, wherein the legs are equidistantly spaced along a periphery of the rigid optical element at 120° distance, so that the rigid optical element can be tilted about the first tilting axis (X) as well as about a second tilting axis (Y).

6. The optical device according to claim 1, wherein the optical device comprises a tilting actuator configured to generate a relative tilt of the rigid optical element with respect to the container about the first and/or second tilting axis.

7. The optical device according to claim 1, wherein the optical device comprises a pivot point (P) where the first and the second tilting axes (X, Y) cross one another, wherein the pivot point (P) is located on the optical axis (A) of the optical device and on the optical surface of the rigid optical element.

8. The optical device according to claim 1, wherein the container comprises a second transparent and elastically deformable membrane, wherein along the optical axis (A), the second membrane is arranged on an opposite side of the container with respect to the first membrane, wherein the liquid is arranged between the first membrane and the second membrane.

9. Optical device according to claim 8, wherein the optical device comprises a lens actuator which is arranged to control a pressure of the transparent liquid in the internal space, wherein a curvature of the second membrane depends on the pressure of the transparent liquid in the internal space, and wherein an optical power of the optical device depends on the curvature of the second membrane.

10. The optical device according to claim 9, wherein the lens actuator configured to move a portion of the container linearly with respect to the rigid optical element without tilting of said portion so as to deform the second membrane and to therewith adjust an optical power of a lens formed by the container.

11. The optical device according to claim 10, wherein said portion of the container comprises a circumferential wall of the container to which the rigid optical element is connected via the transparent and elastically deformable membrane, wherein said further transparent and elastically deformable membrane is connected to the wall 16 such that the transparent liquid 12 is arranged between the two membranes.

12. The optical device according to claim 9, wherein the optical device comprises a reservoir connected to the container, and wherein the lens actuator is configured to pump the liquid from the reservoir into the internal space of the container and vice versa to deform said second membrane and to therewith adjust an optical power of a lens formed by the container.

13. The optical device according to claim 9, wherein the optical device comprises a lens shaper which is attached to the second membrane, and the lens actuator is configured to move the lens shaper with respect to the container to deform the second membrane and to therewith adjust an optical power of a lens formed by the container.

14. The optical device according to claim 2, wherein the mounting structure comprises two opposing connection pads, the connection pads being connected to a housing of the optical device, wherein the first frame member is connected to each connection pad via a bearing, wherein the second frame member is connected to each connection pad via a bearing, wherein the first frame member is rotatably connected to the second frame member via two further bearings, and wherein the respective gimbal bearing and/or the respective further gimbal bearing is one of: a ball bearing, a torsion spring, a meandering spring.

15. An optical device, comprising:
a container enclosing an internal space of the container, the internal space being filled with a transparent liquid, wherein the container comprises a first and an opposing second transparent and elastically deformable membrane delimiting said internal space at least partially, wherein the liquid is arranged between the first and the second membrane,
wherein the container further comprises a transparent rigid optical element being connected to the first membrane, the rigid optical element comprising an optical surface facing the first membrane, the rigid optical element being configured to receive light (L) for passing the light (L) through the transparent liquid residing in the internal space of the container,
a lens shaper arranged on the second membrane,
an actuator configured to push the rigid optical element against the first membrane without tilting the rigid optical element so as to deform said second membrane and to therewith adjust an optical power of a lens formed by the container, and
a supporting structure supporting the lens shaper so that the lens shaper is tiltable about at least a first tilting axis (X) to deflect light passing through the container, wherein the supporting structure is configured to prevent a translation of the lens shaper in a direction being parallel to an optical axis (A) of the optical device.

* * * * *